United States Patent [19]

Chiu

[11] Patent Number: 5,018,405
[45] Date of Patent: May 28, 1991

[54] ANGLE ADJUSTMENT DEVICE FOR HANDLE OF STROLLER

[75] Inventor: Hsiu-Hui Chiu, Tainan Hsien, Taiwan

[73] Assignee: Sunshon Molding Co., Ltd., Tainan Hsien, Taiwan

[21] Appl. No.: 562,556

[22] Filed: Aug. 2, 1990

[51] Int. Cl.⁵ .................. G05G 5/06; B62K 21/16; E05B 35/04
[52] U.S. Cl. .................. 74/529; 74/551.3; 70/214; 70/387
[58] Field of Search .............. 74/527, 529, 551.1, 74/551.3; 70/213, 214, 299, 300, 387; 280/47.315, 47.371, 650; 5/99 A, 99 B, 99 R

[56] References Cited

U.S. PATENT DOCUMENTS

| 2,920,473 | 1/1960 | Hansen | 70/214 |
| 4,577,877 | 3/1986 | Kassai | 74/551.3 |
| 4,586,399 | 5/1986 | Kassai | 74/551.3 |
| 4,587,864 | 5/1986 | Kassai | 74/551.3 |
| 4,733,882 | 3/1988 | Kassai | 74/551.3 X |
| 4,799,371 | 1/1989 | Duncan | 70/214 |
| 4,924,725 | 5/1990 | Takahashi et al. | 280/47.315 X |

FOREIGN PATENT DOCUMENTS

| 2352705 | 12/1977 | France | 74/551.3 |
| 610970 | 6/1978 | U.S.S.R. | 70/213 |

Primary Examiner—Vinh T. Luong
Attorney, Agent, or Firm—Morton J. Rosenberg; David I. Klein

[57] ABSTRACT

An angle adjustment device intends for enabling a first bar to be inclinded relative to a second bar at one of a plurality of angular position. The angle adjustment device includes two casing half members for attaching the first and second bars and mating to house a latch member. The latch member is arranged to move between a locking position with the latch member interengaging the two casing half members and an unlocking position allowing the two casing half members to rotate with respect to each other and an actuating bar securing to the latch member through a sloping engagement and arranged to position the latch member in locking or unlocking position and a rivet fastening the mating first and second casing half members and securing the latch member and actuating bar in position.

1 Claim, 4 Drawing Sheets

ANGLE ADJUSTMENT DEVICE FOR HANDLE OF STROLLER

BACKGROUND OF THE INVENTION

1. Field of the Invention

The present invention relates to an angle adjustment device and more particular to an angle adjustment device for a handle of a stroller, such as infant stroller.

2. Prior Art

Infant strollers and the like are known in the art. There are various different types of infant stroller such as foldable infant stroller but none of them has a handle which is adjustable for being comfortably grasped by the operator of the stroller.

SUMMARY OF THE INVENTION

It is a primary objective of the present invention to provide an angle adjustment device for the handle of a stroller for locating an adjustable U-shaped member of the handle to a position where it may be comfortably grasped by the operator of the stroller.

With the above objective in view, an angle adjustment device according to the present invention comprises first and a second casing half members having a circular side wall defining a recess and containing a circular plate body defining a central passage and evenly formed with a plurality of cavities extending axially, a latch member having a disc opposedly formed with a first series and a second series of leg members projecting axially from opposite sides of the disc and adapted to extend into cavities of the first and second casing half members which mate to house the latch member with the disc disposed in an inner chamber formed by unifying the two resesses and dimensioned to allow the disc to move between a locking position with the first and second series of log members engaged in the cavities of the first and second casing half members and an unlocking position with the first series of the leg members engaged in the cavities of the first casing half member and the second series of the leg members disengaged from the cavities of the second casing half member, an actuating bar arranged to position the disc member in locking or unlocking position and a rivet for fastening the mating casing half members and securing the latch member and the actuating bar in position. Under such construction, two bars relatively attached to the first and second casing half members can be inclined relative to each other at any of a plurality of angle positions desired by the user.

DETAILED DESCRIPTION OF THE PREFERRED EMBODIMENT

Figure 5:
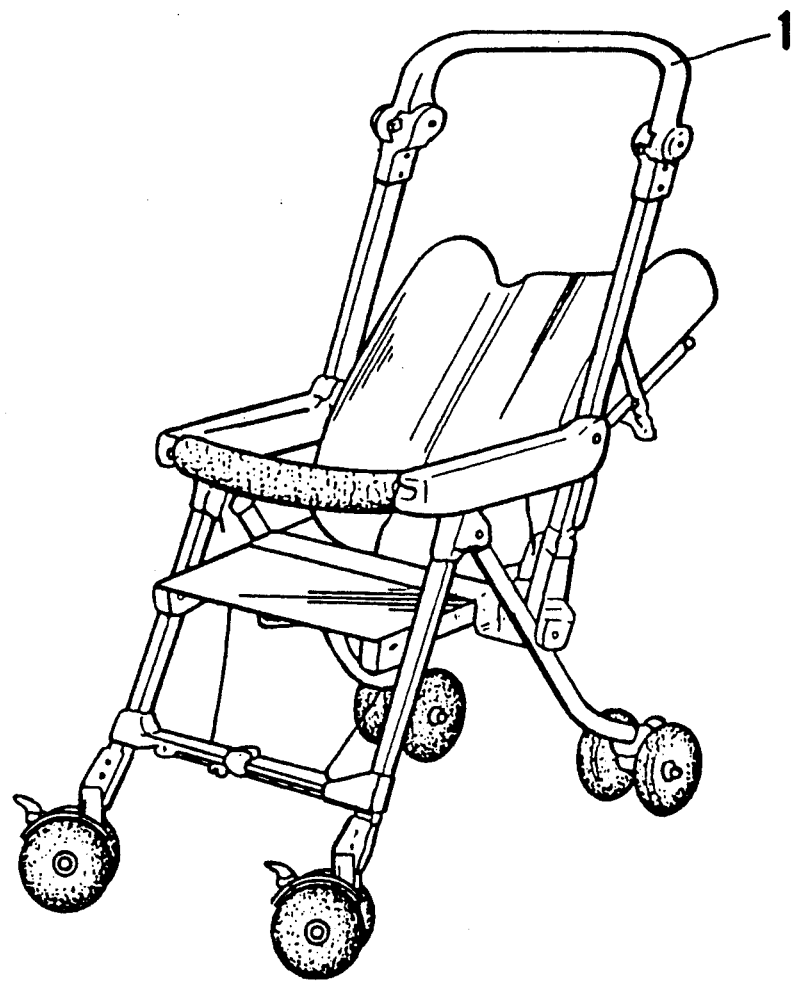
FIG. 5 is a perspective view of an infant stroller of which a handle is mounted with the angle adjustment devices of the present invention.

Referring now to FIG. 5, the handle bar assembly of an infant stroller has a U-shaped member 1 adjustably mounted on top of a pair of parallel handle bars through a pair of angle adjustment devices of the present invention.

Figure 1:
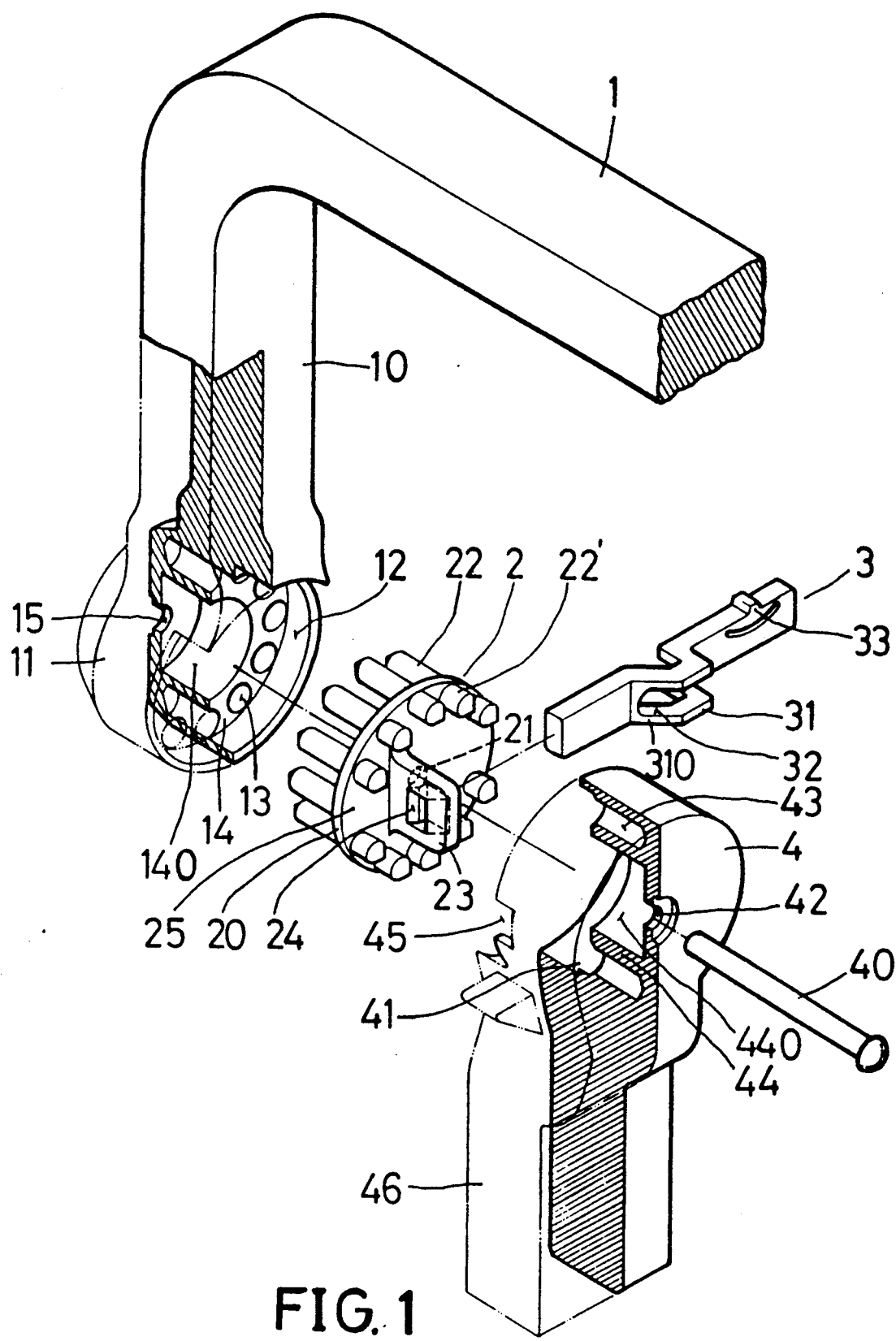
FIG. 1 is a perspective, exploded and partially cutaway view of a preferred embodiment of an angle adjustment device according to the present invention.
Figure 2:
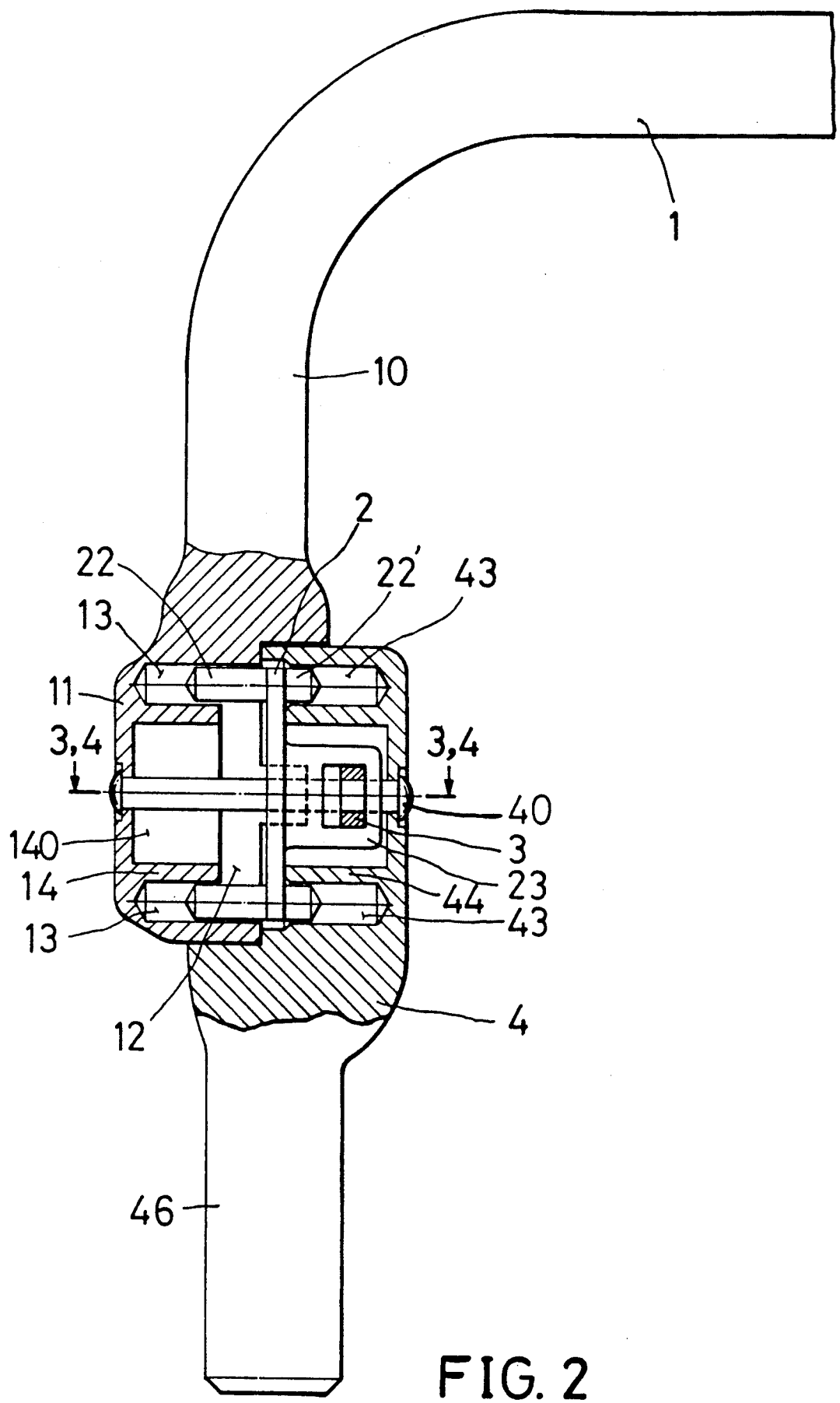
FIG. 2 is a cross-sectional view of the angle adjustment device which is in assembled condition.

The angle adjustment device, as shown in FIGS. 1 and 2, includes a first casing half 11 integrally attached to the lower end of a leg member 10 of the U-shaped member 1, a second casing half 4 is integrally mounted on top of a socket member 46 which has a recess or cavity (not shown) extending downwardly for receiving a top end of a handle bar and solidly securing it in position by means of rivets, as best shown in FIG. 5. A latch member 2 is mounted between the first and second casing halves 11, and 4 and an actuating bar 3 for locking and unlocking operations of the device.

The first casing half 11 occupies one half or two thirds of the thickness of the leg member 10 and has a recess 12 facing inwardly. A circular body 14 is integrally formed within the recess 12 and evenly formed with a plurality of cavities 13 extending axially and in open communication with the recess 12. A central chamber 140 is formed in the central portion of the circular body 14 and a central hole 15 communicating with the central chamber 140 is formed in an outer side wall of the first casing half 11.

The second casing half 4 is similar in construction to the first casing half 11. It has a recess 41 facing outwardly. A circular body 44 is formed within the recess 41 and evenly formed with a plurality of cavities 43 extending axially and facing outwardly. A central chamber 440 is formed in the central portion of the circular body 44 and a central hole 42 is in open communication with the central chamber 440 and is formed in an outer side wall of the second casing half 4. A pair of opposed grooves 45 are formed (only one groove 45 is shown in FIG. 1) in an inner edge of the circular side wall of the second casing half 4.

The latch member 2 includes a disc 20 with the outer portion of a first side thereof evenly provided with a plurality of leg members 22 projecting axially therefrom for extending into corresponding cavities 13 in the circular body 14 and the outer portion of a second side opposite to the first side thereof provided with a plurality of leg members 22' of smaller in length than the opposed leg members 22 and projecting axailly for extending into corresponding cavities 43 in the circular body 44. The disc 20 is also formed with a central hole 21 and a guide plate 23 projecting from the second side thereof. The guide plate 23 is formed with an opening 24 which defines a passage sloping radially outwardly.

The actuating bar 3 has an intermediate fold 31, which is formed with a slot 32, between two flat ends and a protuberance 33 formed on top of a rear end portion. Two pairs of spaced leg members 22' define a diametrical passage which guides the front flat end of the actuating bar 3 to extend through the opening 24 in the guide plate 23.

In assembly, as best shown in FIG. 2, the actuating bar 3 is secured to the latch member 2 by inserting the front flat end thereof through the opening 24 of the guide plate 23. Then the first and second casing halves 11, 4 mate to house the latch member 2 within a chamber formed by unifying the recesses 12, 41 and dimensioned to allow the disc 20 movable along axial direction. The mating first and second casing halves 11, 4 are fastened by a rivet 40 which sequentially extends through the central hole 42 of the second half 4, the slot 32 of the actuating bar 3, the central hole 21 of the disc 20 and the central hole 15 of the first casing half 11 to secure the latch member 2 and the actuating bar 3 in position.

Figure 3:
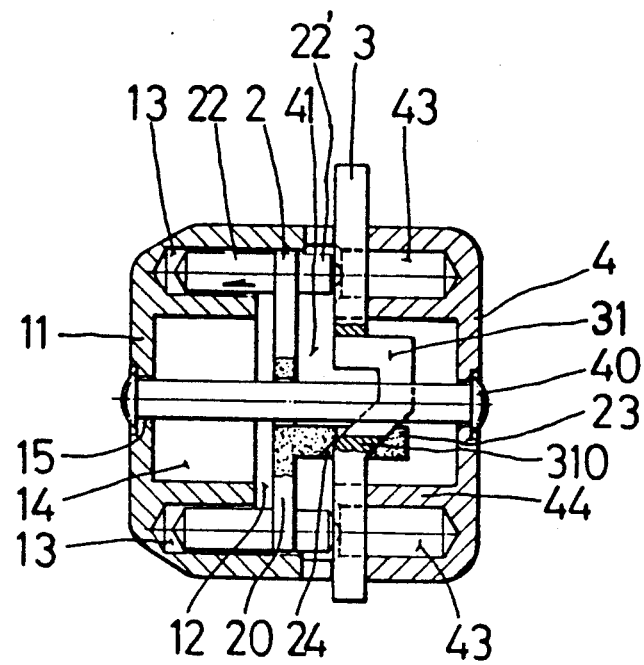
FIG. 3 is a cross-sectional view of the angle adjustment device, which is in unlocking condition, taken along line 3,4—3,4 in FIG. 2.
Figure 4:
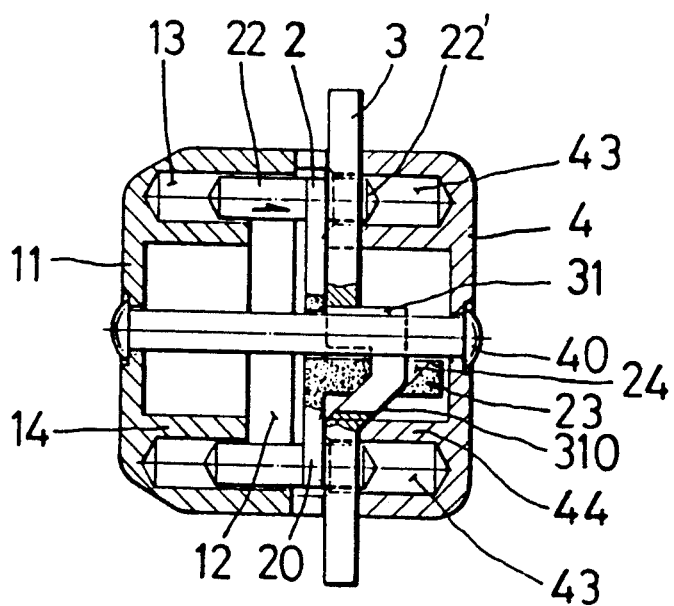
FIG. 4 is a cross-sectional view of the angle adjustment device, which is in locking condition, taken along line 3,4—3,4 in FIG. 2.

In operation, force can be exerted on either ends of the actuating bar 3 so as to locate the latch member 2 in an unlocking position, as shown in FIG. 3 or a locking position, as best shown in FIG. 4. The fold 31 of the actuating bar 3, which is now slidably engaged in the opposed grooves 45 of the second casing half 4 with two flat ends thereof protruding from the grooves 45, has slopping front section 310 engaging in the sloping passage 24 formed in the guide plate 23. As shown in FIG. 3, when the actuating bar 3 is formed to move rearwardly, the sloping front section 310 of the fold 31 slides in the passage 24 of the guide plate 23 to locate latch member 2 in its ulocking position where the leg members 22 extend deep into corresponding cavities 13 and the leg members 22' are released from the cavities 43 in the circular body 44 of the second casing half 4 that enables the leg member 10 of the U-shaped member 1 to be inclined relative to the handle bar at one of a plurality oof angular positions desired by the user.

As shown in FIG. 4, the actuating bar 3 is forced to move frontwardly, the sloping engagement between the fold 31 and the guide plate 23 of the latch member 2 causes the latch member 2 to move from its unlocking position into its locking position where the leg members 22 still engaging in and extend shallow into corresponding cavities 13 and the leg members 22' extend into corresponding cavities 43 in the circular body 44 of the second casing half 4 the results locking the first and the second casing halves 11, 4 of this device.

What is claimed is:

1. An angle adjustment device for adjustably and fixedly positioning a first bar to a second bar at one of a plurality of angular positions comprising:

a first casing half member having a first recess and a first inner circular plate body having a first central passage extending axially therethrough, said inner circular plate body formed with a plurality of first cavities extending axially and in open communication with the recess;

means integrally attached to the first casing half member for receiving an end portion of the first bar;

a second casing half member having a second recess, said second casing half mating with the first casing half member having formed therein a pair of spaced grooves which define a passage across a chamber formed by unifying said first and second recesses, said second casing half member having a second circular plate body defining a second central passage adapted to be in alignment with the first central passage in the first casing half member and said inner circular plate body formed with a plurality of second cavities extending axially and communicating the second recess of the second casing half member;

means integrally attached to the second casing half member for receiving an end portion of the second bar;

a latch member including a disc member formed with a central opening adapted to be in alignment with the first central passage in the first casing half member, a plurality of first leg members projecting axially from a first side of the disc member and adapted to be movably received in the first cavities in the first circular plate body of the first casing half member, a plurality of second leg members projecting axially from a second side opposite to the first side of the disc member and adapted to be movably received in the second cavities in the second circular plate body of the second casing half member and a guide plate projecting from the second disc member and formed with an opening which defines a passage corresponding to the passage defined by the spaced grooves and sloping radially inwardly with respect to the disc member, said latch member being adapted to be housed in the mating first and second casing half members with the disc member thereof being disposed in the chamber which is dimensioned to allow the disc member therein to move axially between (1) a locking position with the first leg members of the disc member being correspondingly engaged in the first cavities of the first circular plate body of the first casing half member and the second leg members thereof being engaged in the cavities of the second circular plate body of the second casing half member and (2) an unlocking position where the first leg members the disc member are engaged in the first cavities of the circular member of the first casing half member and the second leg members thereof being disengaged from the second cavities of the circular plate body of the second casing half member;

an actuating bar having two end portions protruding from the grooves of the mating first and second casing half members and an intermediate fold between the end portions having a slot corresponding to the central opening of the disc member and a sloping section being slidably inserted through the opening in the guide plate of the disc member to position the disc member in either a locking or unlocking position displacing the actuating bar in the spaced groooves; and a rivet member extending through the first and second central passages of the mating first and second casing half members, the central hole of the disc member and the slot of the actuating bar for fastening the mating first and second casing half members and securing the latch member and the actuating bar in position.

* * * * *